United States Patent
Sahlin et al.

(10) Patent No.: US 11,172,510 B2
(45) Date of Patent: Nov. 9, 2021

(54) ENHANCED PRACH PREAMBLE FORMAT (71) Applicant: Telefonaktiebolaget LM Ericsson (publ), Stockholm (SE)

(72) Inventors: Henrik Sahlin, Mölnlycke (SE); Håkan Andersson, Linköping (SE); Robert Baldemair, Solna (SE); Johan Furuskog, Stockholm (SE); Peter Nauclér, Knivsta (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 15/125,641

(22) PCT Filed: Mar. 25, 2014

(86) PCT No.: PCT/EP2014/055898
§ 371 (c)(1),
(2) Date: Sep. 13, 2016

(87) PCT Pub. No.: WO2015/144208
PCT Pub. Date: Oct. 1, 2015

(65) Prior Publication Data
US 2017/0006637 A1    Jan. 5, 2017

(51) Int. Cl.
*H04W 74/08*    (2009.01)
*H04W 74/00*    (2009.01)
(Continued)

(52) U.S. Cl.
CPC ....... *H04W 74/0833* (2013.01); *H04L 5/0007* (2013.01); *H04W 72/0446* (2013.01);
(Continued)

(58) Field of Classification Search
None
See application file for complete search history.

(56) References Cited

U.S. PATENT DOCUMENTS 8,340,234 B1    12/2012    Cheng et al.
8,743,914 B1    6/2014    Jensen
(Continued)

FOREIGN PATENT DOCUMENTS

CN    103001749 A    3/2013
CN    103384376 A    11/2013
(Continued)

OTHER PUBLICATIONS

Sahlin, Henrik et al., "Random Access Preamble Format for Systems with Many Antennas", Globecom Workshops, Dec. 8-12, 2014, pp. 1-6, Ericsson Research, Ericsson System and Technologies, Ericsson AB, Sweden.
(Continued)

*Primary Examiner* — Noel R Beharry
*Assistant Examiner* — Rodrick Mak
(74) *Attorney, Agent, or Firm* — Murphy, Bilak & Homiller, PLLC (57) ABSTRACT

The present invention relates to a user terminal, UE, in a wireless communication system (1). The user terminal (4a, 4b) comprises a receiver unit (5a, 5b), a transmitter unit (6a, 6b) configured to transmit data in transmit sub-frames occurring at defined sub-frame intervals, and a control unit (7a, 7b) configured to control the receiver circuit (5a, 5b) and the transmitter circuit (6a, 6b). The control unit (7a, 7b) is also configured to create a PRACH, Physical Random-Access Channel, preamble (27) as an uplink transmission to a node (2) that is arranged to receive communication from the user terminal in said sub-frames. This communication comprises OFDM, Orthogonal Frequency-Division Multiplexing, based symbols (20). The control unit (7a, 7b) is configured to create each PRACH preamble (27) such that is comprises a sequence of a plurality of identical random access sequences (s(n)), where each random access
(Continued)

sequence (s(n)) has the same length in time as each one of the OFDM based symbols (20a, 20b, 20c). The present invention also relates to a corresponding method.

15 Claims, 11 Drawing Sheets (51) Int. Cl.
*H04L 5/00* (2006.01)
*H04W 72/04* (2009.01)
*H04W 72/02* (2009.01)

(52) U.S. Cl.
CPC ..... *H04W 72/0453* (2013.01); *H04W 74/004* (2013.01); *H04W 74/006* (2013.01); *H04W 72/02* (2013.01)

(56) References Cited

U.S. PATENT DOCUMENTS

| | | | |
|---|---|---|---|
| 2004/0100898 A1 | 5/2004 | Anim-Appiah et al. | |
| 2006/0215539 A1* | 9/2006 | Vrcelj | H04L 25/0216 370/208 |
| 2006/0215779 A1 | 9/2006 | Shiina | |
| 2007/0217526 A1 | 9/2007 | Park et al. | |
| 2008/0049708 A1* | 2/2008 | Khan | H04B 1/713 370/343 |
| 2008/0225822 A1 | 9/2008 | Zhang et al. | |
| 2008/0316961 A1* | 12/2008 | Bertrand | H04W 74/004 370/329 |
| 2009/0010316 A1 | 1/2009 | Rofougaran | |
| 2009/0225908 A1* | 9/2009 | Masuda | H04L 27/2647 375/343 |
| 2009/0232126 A1 | 9/2009 | Cordeiro et al. | |
| 2010/0020905 A1 | 1/2010 | Mansour et al. | |
| 2010/0054235 A1 | 3/2010 | Kwon et al. | |
| 2010/0172423 A1 | 7/2010 | Chrabieh et al. | |
| 2010/0195700 A1 | 8/2010 | Ogawa et al. | |
| 2010/0309993 A1 | 12/2010 | Hao et al. | |
| 2010/0311428 A1* | 12/2010 | Zhang | H04L 5/005 455/447 |
| 2011/0013546 A1* | 1/2011 | Hao | H04L 5/0007 370/294 |
| 2011/0086658 A1 | 4/2011 | Baldemair | |
| 2011/0243040 A1 | 10/2011 | Khan et al. | |
| 2012/0069793 A1* | 3/2012 | Chung | H04W 76/27 370/315 |
| 2012/0093200 A1 | 4/2012 | Kyeong | |
| 2012/0155405 A1* | 6/2012 | You | H04W 74/0833 370/329 |
| 2012/0250523 A1 | 10/2012 | Miki | |
| 2012/0314561 A1 | 12/2012 | Xie et al. | |
| 2013/0045690 A1 | 2/2013 | Seol et al. | |
| 2013/0070726 A1 | 3/2013 | Zhang et al. | |
| 2013/0121315 A1 | 5/2013 | Langereis et al. | |
| 2013/0155891 A1* | 6/2013 | Dinan | H04B 7/0456 370/252 |
| 2013/0242730 A1* | 9/2013 | Pelletier | H04W 28/0284 370/230 |
| 2014/0022884 A1* | 1/2014 | Bao | H04W 74/0833 370/210 |
| 2014/0044108 A1 | 2/2014 | Earnshaw et al. | |
| 2014/0219162 A1* | 8/2014 | Eyuboglu | H04W 16/26 370/315 |
| 2015/0056981 A1 | 2/2015 | Song et al. | |
| 2015/0181624 A1* | 6/2015 | Hwang | H04L 5/0053 370/329 |
| 2015/0359007 A1* | 12/2015 | Liu | H04L 5/005 370/329 |
| 2015/0382336 A1 | 12/2015 | Zhang et al. | |
| 2016/0192398 A1* | 6/2016 | Wang | H04W 74/0833 370/329 |
| 2016/0353440 A1* | 12/2016 | Lee | H04W 4/70 |
| 2017/0006637 A1 | 1/2017 | Sahlin et al. | |
| 2019/0281624 A1* | 9/2019 | Kim | H04L 27/26 |

FOREIGN PATENT DOCUMENTS

| | | | |
|---|---|---|---|
| CN | 105636108 A | 6/2016 | |
| EP | 1274193 A1 | 1/2003 | |
| WO | 2005088853 A1 | 9/2005 | |
| WO | 2007089199 A2 | 8/2007 | |
| WO | 2007149290 A2 | 12/2007 | |
| WO | 2008115247 A1 | 9/2008 | |
| WO | 2009047732 A2 | 4/2009 | |
| WO | WO-2009047732 A2 * | 4/2009 | ............ H04L 23/02 |
| WO | 2009151358 A1 | 12/2009 | |
| WO | 2014110875 A1 | 7/2014 | |
| WO | 2015084225 A1 | 6/2015 | |
| WO | 2015084226 A1 | 6/2015 | |
| WO | 2015144208 A1 | 10/2015 | |
| WO | 2015144256 A1 | 10/2015 | |
| WO | 2015188861 A1 | 12/2015 | |
| WO | 2016072886 A1 | 5/2016 | |
| WO | 2016141782 A1 | 9/2016 | |
| WO | 2018053748 A1 | 3/2018 | |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.3.0, Jun. 1, 2013, pp. 1-108, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.3.0, Jun. 1, 2013, pp. 1-176, 3GPP, France.

Sesia, S. et al., "LTE. The UMTS Long Term Evolution. From Theory to Practice", Second Edition, Jan. 1, 2011, pp. 1-794, John Wiley & Sons Ltd.

Gadhiok, Manik, et al., "Preamble-Based Symbol Timing Estimation for Wireless OFDM Systems", IEEE 2007 Conference Record of the Forty-First Asilomar Conference on Signals, Systems and Computers, Nov. 4-7, 2007, pp. 1791-1794.

* cited by examiner

ENHANCED PRACH PREAMBLE FORMAT

TECHNICAL FIELD

The present invention relates to a user terminal in a wireless communication system, where the user terminal comprises a receiver unit, a transmitter unit configured to transmit data in transmit sub-frames occurring at defined sub-frame intervals, and a control unit configured to control the receiver circuit and the transmitter circuit. The control unit is also configured to create a PRACH (Physical Random-Access Channel) preamble as an uplink transmission to a node that is arranged to receive communication from the user terminal in said sub-frames. This communication comprises OFDM (Orthogonal Frequency-Division Multiplexing) based symbols.

The present invention also relates to a method for creating a PRACH (Physical Random-Access Channel) preamble that is used at an uplink transmission from a user terminal to a node in a wireless communication system. The communication uses OFDM (Orthogonal Frequency-Division Multiplexing) based symbols, transmitted and received in sub-frames occurring at defined sub-frame intervals

BACKGROUND

In a typical cellular radio system, end-user radio or wireless terminals, also known as user terminals, mobile stations and/or user equipment units (UE:s), are arranged to communicate via a radio-access network (RAN) to one or more core networks. The radio-access network (RAN) covers a geographical area which is divided into cell areas, with each cell area being served by a base station, e.g., a radio base station (RBS), which in some networks may also be called, for example, a "NodeB" or an "eNodeB". In the following, the terms UE and eNodeB will be used. A cell is a geographical area where radio coverage is provided by the radio base station equipment at a base station site.

The Universal Mobile Telecommunications System (UMTS) is a third generation mobile communication system, which evolved from the Global System for Mobile Communications (GSM). UTRAN is a radio-access network that uses wideband code-division multiple access (W-CDMA) for communications between the UE:s and the base stations, referred to in UTRAN standards as NodeB:s.

In a forum known as the 3$^{rd}$ Generation Partnership Project (3GPP), telecommunications suppliers propose and agree upon standards for third generation networks generally and UTRAN specifically, and investigate techniques to enhance wireless data rates and radio capacity. 3GPP has undertaken to evolve further the UTRAN and GSM-based radio-access network technologies. Several releases for the Evolved Universal Terrestrial Radio-access Network (E-UTRAN) specification have been issued, and the standards continue to evolve. The Evolved Universal Terrestrial Radio-Access Network (E-UTRAN) comprises the Long-Term Evolution (LTE) and System Architecture Evolution (SAE).

Transmission and reception from a node, e.g., a radio terminal like a UE in a cellular system such as LTE, can be multiplexed in the frequency domain or in the time domain, or combinations thereof. In Frequency-Division Duplex (FDD) systems, downlink and uplink transmissions take place in different, sufficiently separated, frequency bands. In Time Division Duplex (TDD), downlink and uplink transmissions take place in different, non-overlapping time slots. Thus, TDD can operate in unpaired frequency spectrum, whereas FDD requires paired frequency spectrum. Here, only one spectrum interval is available in an unpaired spectrum such that this single spectrum interval is used both for uplink and downlink. This in contrast to a paired frequency spectrum, in which different spectrum intervals are available for downlink and uplink respectively.

Typically, a transmitted signal in a communication system is organized in some form of frame structure. For example, LTE uses ten equally-sized sub-frames 0-9 of length 1 millisecond per radio frame.

In LTE, the downlink is based on Orthogonal Frequency-Division Multiplexing (OFDM) while the uplink is based on Discrete-Fourier-Transform-spread (DFT-spread) OFDM, also known as Single-Carrier Frequency-Division Multiple Access (SC-FDMA). The transmission-time interval (TTI) equals a sub-frame of 1 millisecond, which is made up of 14 OFDM symbols in downlink and 14 SC-FDMA symbols in uplink, given a cyclic prefix of normal length. A cyclic prefix is attached to each of the 14 OFDM symbols.

Portions of the OFDM and SC-FDMA symbols transmitted are used to carry user data in physical channels referred to as the Physical Downlink Shared Channel (PDSCH) and Physical Uplink Shared Channel (PUSCH). The received OFDM and SC-FDMA symbols are processed using FFT:s (Fast Fourier Transforms) where one FFT is calculated for each OFDM and SC-FDMA symbol. For example, these FFTs have a size of 2048 samples.

A Physical Random-Access Channel (PRACH) is used for initial access for a UE and timing offset estimation. Upon reception in the eNodeB, the PRACH must thus be detected with high accuracy, and accurate timing offset estimation must be done. A timing offset is used to compensate for the time it takes for a signal to travel to a UE and back to the eNodeB, such that the eNodeB may correctly detect information received from the UE via the PUSCH.

PRACH may consist of one or two preambles, each having a certain length in samples, for example 24 576 samples. The preambles have a cyclic prefix, which for example may have a length between 3 168 and 21 024 samples for different formats.

Several methods have been proposed for how to detect the PRACH preambles. In a full frequency approach, the received signal is detected in a PRACH receiver window and processed with a PRACH FFT corresponding to the length of the preamble. Hence, a PRACH FFT of length 24 576 is thus required for each receive antenna. The length of the preamble, which is considerably longer than the SC-OFDM symbols used in uplink, is used in order to produce sufficient output power. This in turn enhances PRACH coverage in the cell.

With the emerging 5G technologies with much higher carrier frequencies, an increased number of antenna elements is required to obtain a sufficient coverage. An FFT is then typically calculated for each antenna or subset of antennas, such that different users and channels in different sub-bands of the received signal can be extracted before further signal processing.

In a TDD (Time-Division Duplex) system, the same frequency band is used both for downlink and uplink. Both the UE and the eNodeB must then switch between transmitting and receiving, assuming that full duplex operation is not possible.

With a large number of receiver antennas, the amount of FFT processing in the receiver is also large. With dedicated antenna-signal processing only used for PRACH, a lot of special hardware for PRACH must be included. This extra hardware comes at a cost in material and design effort, as well as increased energy consumption. Also, running PRACH-specific antenna-signal processing consumes power and requires cooling capacity.

A need therefore exists for reducing the amount of FFT processing at the receiving eNodeB.

SUMMARY

It is an object of the present invention to provide a user terminal that enables the amount of FFT processing at the receiving eNodeB to be reduced.

Said object is obtained by means of a user terminal in a wireless communication system, where the user terminal comprises a receiver unit, a transmitter unit configured to transmit data in transmit sub-frames occurring at defined sub-frame intervals, and a control unit configured to control the receiver circuit and the transmitter circuit. The control unit is also configured to create a PRACH (Physical Random-Access Channel) preamble as an uplink transmission to a node that is arranged to receive communication from the user terminal in said sub-frames. This communication comprises OFDM (Orthogonal Frequency-Division Multiplexing) based symbols. The control unit is further configured to create each PRACH preamble such that is comprises a sequence of a plurality of identical random access sequences, where each random access sequence has the same length in time as each one of the OFDM based symbols.

Said object is also obtained by means of a method for creating a PRACH (Physical Random-Access Channel) preamble that is used at an uplink transmission from a user terminal to a node in a wireless communication system. The communication uses OFDM (Orthogonal Frequency-Division Multiplexing) based symbols, transmitted and received in sub-frames occurring at defined sub-frame intervals. The method comprises the step of creating each PRACH preamble such that is comprises a sequence of a plurality of identical random access sequences, where each random access sequence has the same length in time as each one of the OFDM based symbols.

According to an example, the user terminal is arranged to transmit one of two PRACH preambles chosen from a set of possible PRACH preambles, in one sub-frame, the two possible PRACH preambles having mutually different random access sequences.

According to another example, the user terminal is arranged to transmit a chosen PRACH preamble at one of two or more possible different frequency bands.

According to another example, the PRACH preamble is shortened such that it begins later in the corresponding sub-frame by means of an initial guard time.

According to another example, each PRACH preamble comprises a plurality of random access sequences that are preceded by a cyclic prefix.

According to another example, each PRACH preamble comprises a plurality of random access sequences succeeded by a final part that is part of one of the random access sequences. The final part is inserted at the end of said PRACH preamble such that said PRACH preamble covers the whole length of a last FFT window.

Other examples are disclosed in the dependent claims.

A number of advantages are provided by means of the present invention. For example:
No special PRACH FFT is needed at the receiver node.
Spectrum efficient, since no frequency guard is needed.
No frequency guard needed as the same subcarrier spacing is used for PRACH as for other channels.
In TDD no special (truncated) downlink sub-frame is needed prior to a PRACH sub-frame.

BRIEF DESCRIPTION OF THE DRAWINGS

The present invention will now be described more in detail with reference to the appended drawings, where.

DETAILED DESCRIPTION

The development of the 5G access technology and air interface is still very premature, but there have been some early publications on potential technology candidates. A candidate on a 5G air interface is to scale the current LTE, which is limited to 20 MHz bandwidth, N times in bandwidth with 1/N times shorter time duration, here abbreviated as LTE-Nx. A typical value may be N=5 so that the carrier is scaled from 20 MHz to 100 MHz bandwidth and the sub-frame is scaled from 1 millisecond to 0.2 milliseconds. The sampling rate would then also be scaled with the same factor, i.e. from 30.72 MHz to 153.6 MHz, while keeping the same size of all FFT operations. A radio-frame of 10 ms may here be divided into fifty sub-frames, each of length 0.2 ms, which is the case for the examples in the rest of the description.

The sampling frequency would also be scaled N times from 30.72 MHz to 153.6 MHz. With this approach, many functions in LTE can remain the same, which would simplify standardization effort and allow for a reuse of technology components. The length of a sub-frame might thus be significantly reduced. This will reduce user data delays, which will be discussed below. Furthermore, both downlink and uplink might be based on OFDM.

Figure 1:
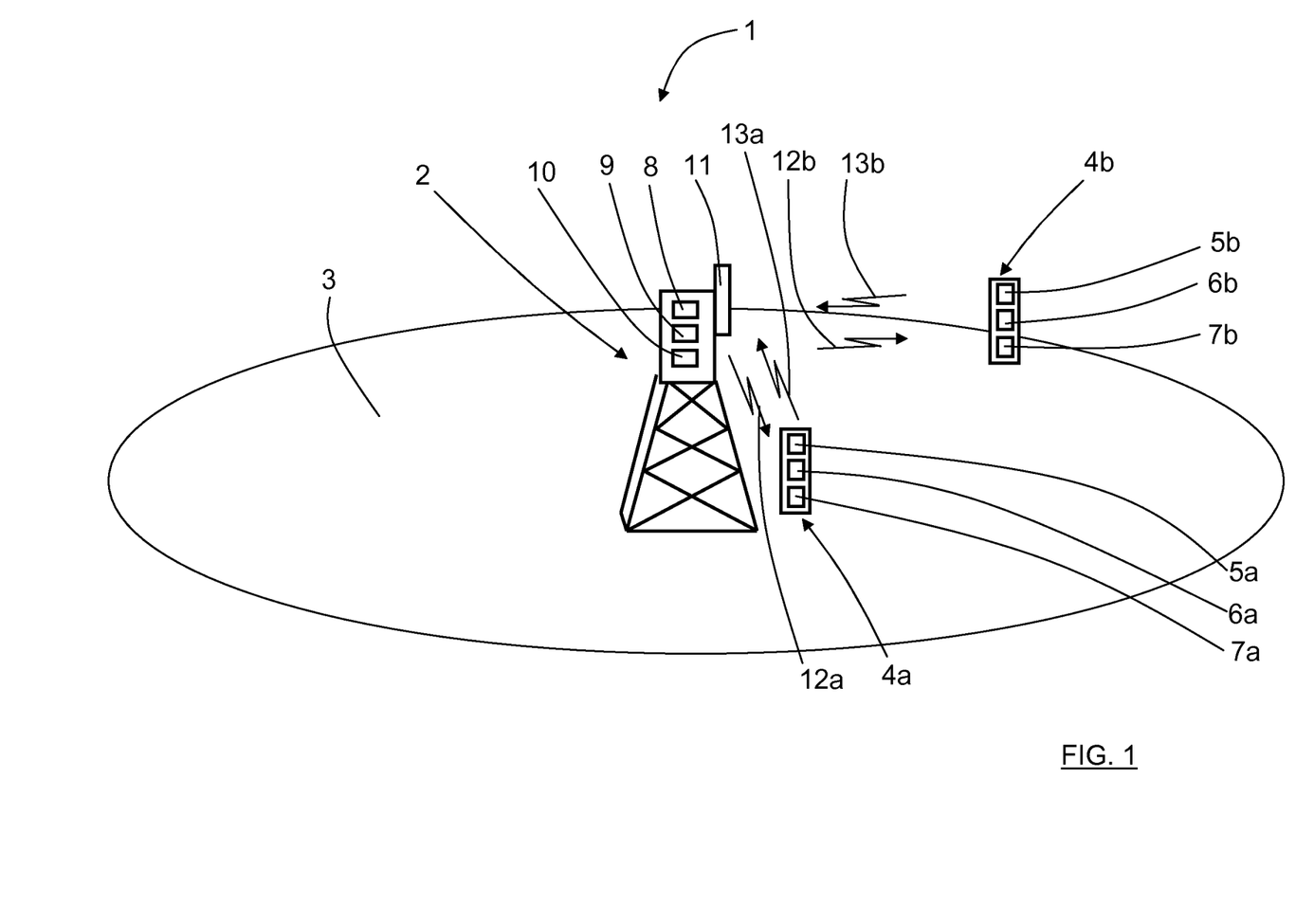
FIG. 1 schematically shows a node, eNodeB, and user terminals, UE:s, in a wireless communication network.

With reference to FIG. 1, there is mobile communication network 1 comprising a node 2 in a cell 3 that constitutes a geographic cell area. Here, the node 2 is in the form of a base station 2, which is referred to as an eNodeB in the context of an LTE (Long-Term Evolution) radio-access network, formally known as the Evolved Universal Terrestrial Radio-access Network (E-UTRAN). The mobile communication network is arranged to provide wireless communication services to user terminals, which are referred to as "user equipment" or "UE" in 3GPP (3$^{rd}$ Generation Partnership Project) terminology. The terms eNodeB and UE will be used in the following, here a first UE 4a is close to the eNodeB 2, and a second UE 4b is far away from the eNodeB 2, but both UE:s 4a, 4b are within the cell 3.

Each UE 4a, 4b comprises a corresponding receiver unit 5a, 5b, transmitter unit 6a, 6b configured to transmit data in transmit sub-frames occurring at defined sub-frame intervals and having a predetermined number of symbol intervals, and a control unit 7a, 7b configured to control said receiver circuit 5a, 5b and said transmitter circuit 6a, 6b.

Correspondingly, the eNodeB 2 comprises a receiver unit 8, a transmitter unit 9, and a control unit 10. The eNodeB 2 also comprises an antenna arrangement 11 that may comprise one or more array antennas.

The UE:s 4a, 4b receive signals from the eNodeB 2 on one or more downlink (DL) channels 12a, 12b, and transmit signals to the eNodeB 2 on one or more uplink (UL) channels 13a, 13b. In a TDD (Time-Division Duplex) system, the same frequency band is used both for downlink and uplink. Both the UE:s 4a, 4b and the eNodeB 2 must then switch between transmitting and receiving, assuming that full duplex operation is not possible.

Figure 2:
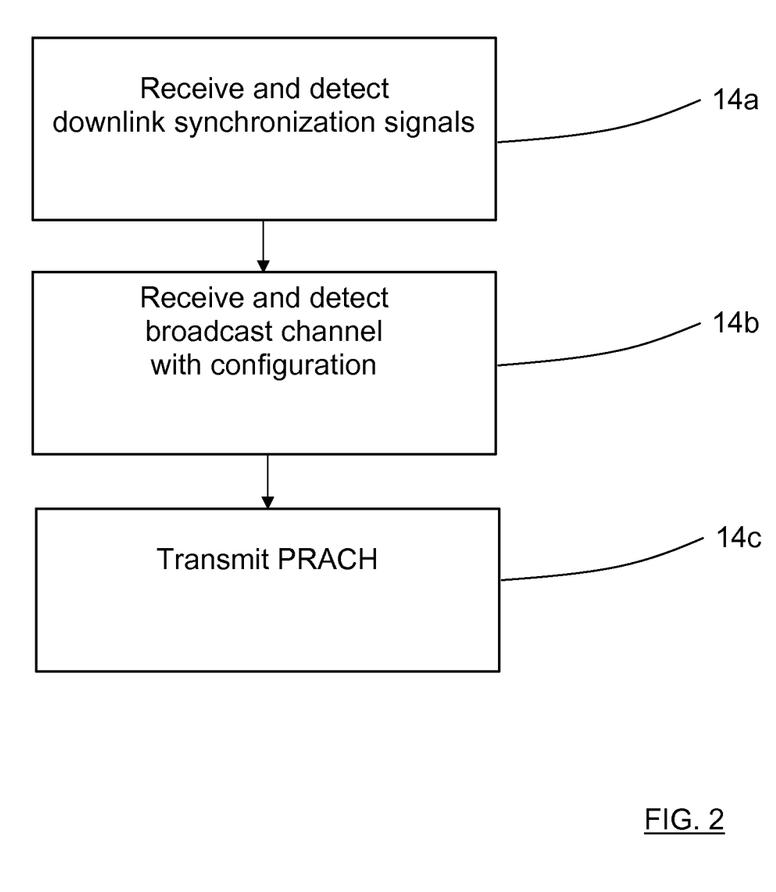
FIG. 2 shows a flowchart of the initial setup steps taken at a UE.
Figure 3:
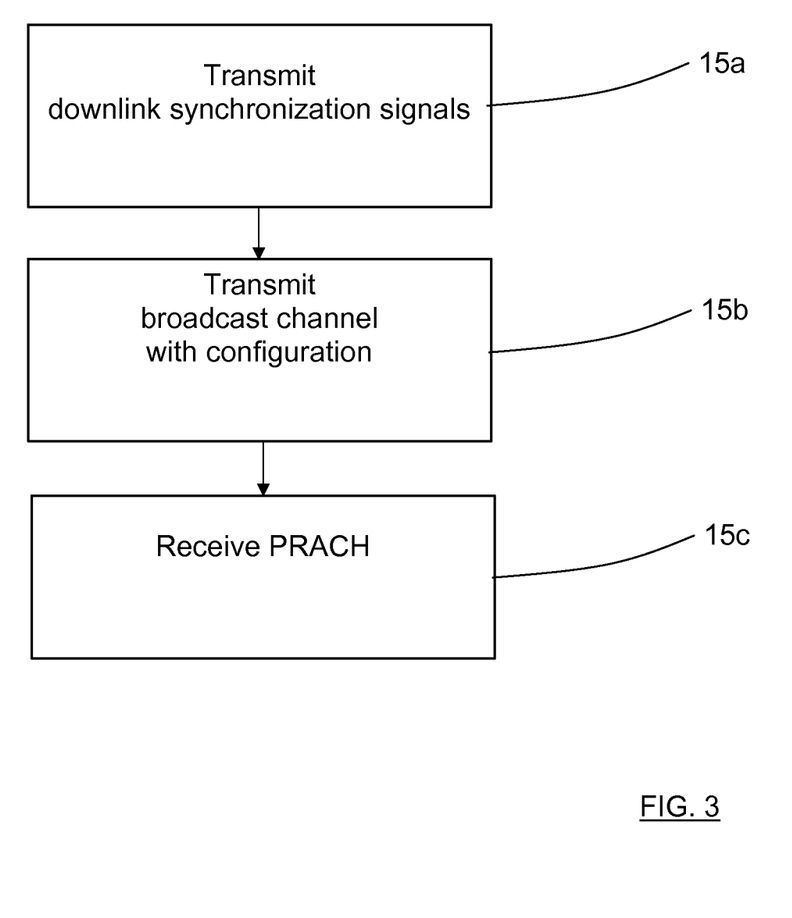
FIG. 3 shows a flowchart of the initial setup steps taken at an eNodeB.

With reference to FIG. 2 and FIG. 3, showing corresponding steps at the first UE 4a and the eNodeB 2, at initial setup, the UE 4a starts by receiving and synchronizing 14a to downlink synchronization signals transmitted 15a by the eNodeB 2. As an example, in LTE, the first UE 4a starts by detecting the PSS (Primary Synchronization Signal) after which the first UE 4a will have sub-frame synchronization, OFDM-symbol synchronization, and know the cell identity (cell ID) group. Then the first UE 4a detects SSS (Secondary Synchronization Signal), after which the first UE 4a is frame synchronized and knows the cell ID.

For example, PSS and SSS may be transmitted in sub-frame 0 and 25 in a dynamic TDD system.

The first UE 4a then receives and detects 14b a system information carried by a broadcast signal transmitted 15b by the eNodeB 2. In LTE, this broadcast information is carried by PBCH (Physical Broadcast Channel). Based on broadcast information, or preconfigured in the first UE 4a according to specification, a PRACH (Physical Random-Access Channel) preamble signal is constructed in the first UE 4a. The first UE 4a then transmits 14c the PRACH preamble, which is received 15c by the eNodeB 2.

The broadcast information can relate to time and frequency allocation of PRACH, such that the first UE 4a knows when and where it is allowed to transmit PRACH preambles, such that the PRACH preambles are received by the eNodeB 2.

Figure 7:
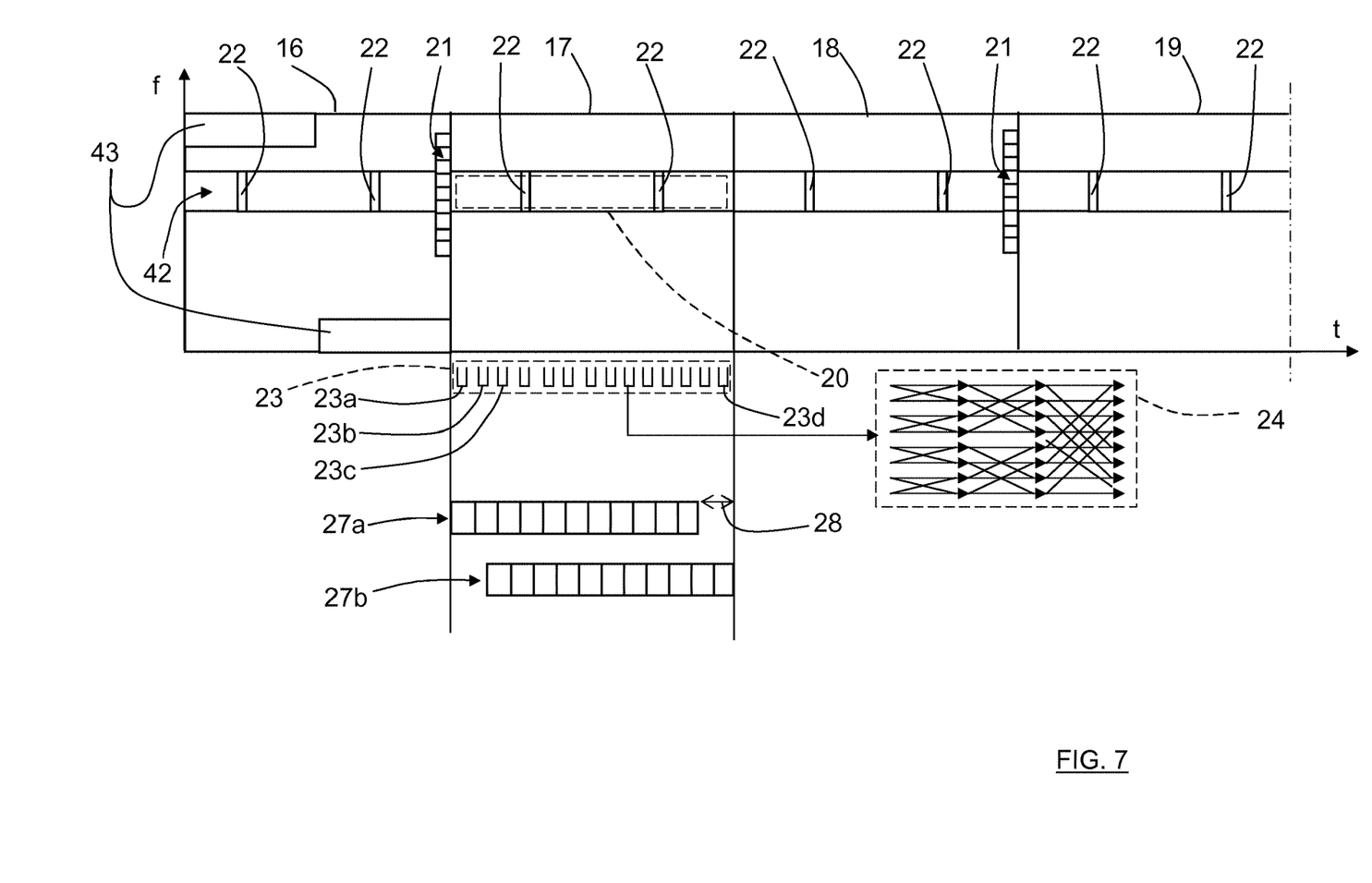
FIG. 7 shows a couple of sub-frames at the eNodeB.

With reference also to FIG. 7, a number of sub-frames 16, 17, 18, 19 at the eNodeB 2 are shown over frequency and time. A radio-frame of 10 ms is in this LTE-Nx example divided into fifty sub-frames, each of length 0.2 ms, where each sub-frame comprises fourteen intervals for OFDM or SC-FDMA (Single-Carrier Frequency-Division Multiple Access) symbols 20 (only schematically indicated in FIG. 7) in uplink, given a cyclic prefix of normal length. Portions of the OFDM or SC-FDMA symbols 20 transmitted in these symbol intervals are used to carry user data in the Physical Uplink Shared Channel 42 (PUSCH). The uplink comprises sounding reference signals (SRS) 21, a reference signal that for example might be transmitted every second time frame, and regularly occurring reference pilot signals 22. A Physical Uplink Control Channel 43 (PUCCH) jumps from one frequency to another between a first half of a sub-frame 16 and a second half of the sub-frame 16, a half sub-frame also being known as a slot.

All of the OFDM or SC-FDMA symbols transmitted in uplink, i.e. PUSCH 42, reference pilots signals 22, PUCCH 43 and SRS are received in a set of fourteen FFT windows 23. Each such FFT window 23a, 23b, 23c, 23d (only a few indicated in FIG. 7) is processed in an FFT 24 of size 2048.

In each FFT window 23a, 23b, 23c, 23d, the received OFDM or SC-FDMA symbols 20 are processed with an OFDM FFT 24, which for example is of the size 2048 samples. The SC-FDMA symbols are often referred to as DFT spread-OFDM. A SC-FDMA symbol can thus be referred as an OFDM based symbol.

The timing of the UE transmissions is controlled by the eNodeB 2, so that the data-carrying portions of consecutive uplink sub-frames from multiple UE:s do not overlap with one another and fall within the FFT windows 23.

Figure 4:
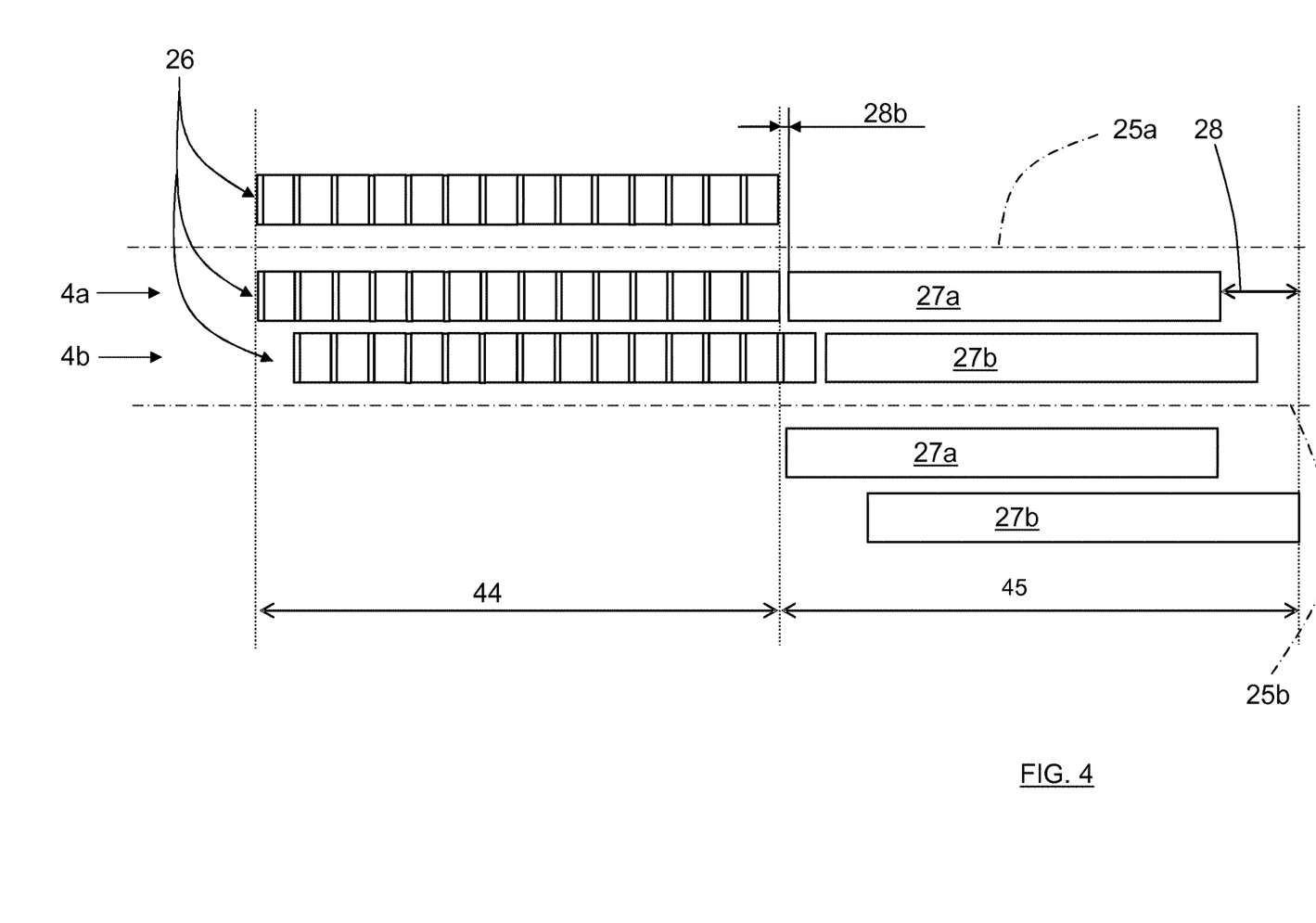
FIG. 4 shows two communication sub-frames in uplink and downlink, where two PRACH preambles are shown to illustrate guard time.

Propagation delays may differ between UEs 4a, 4b due to their respective distance from the eNodeB 2. This is illustrated in FIG. 4, where it is shown how differences in time between received PRACH preambles of different UE:s 4a, 4b are resulting in different timing offsets when transmitting. In FIG. 4, eNodeB DL is shown above a first dash-dotted line 25a, UE DL and UL are shown below the first dash-dotted line 25a and above a second dash-dotted line 25b. Below the second dash-dotted line 25b, eNodeB UL is shown.

Upon reception in the eNodeB 2, the PRACH preamble must be detected with high accuracy and accurate timing offset estimations must be done such that the UE transmissions of data-carrying portions of consecutive uplink sub-frames from multiple UE:s do not overlap with one another and fall within the FFT windows 23.

In FIG. 4, a DL message 26 in the form of a PDSCH (Physical Downlink shared Channel) is sent from the eNodeB 2, and is received by the first UE 4a and the second UE 4b in UE DL in a first sub-frame 44. The first UE 4a sends a first PRACH preamble 27a and the second UE 4b sends a second PRACH preamble 27b in response to the received DL message 26 in a second sub-frame 45. The PRACH preambles 27a, 27b may be transmitted for many other reasons, for example when the UE:s 4a, 4b do not react to a DL transmission, but rather require initial UL resources for transmitting on the UL. Examples of other occasions for transmitting a PRACH preamble are hand-over and re-synchronization. The first PRACH preamble 27a has an early arrival, i.e. the first UE 4a is very close to the eNodeB 2.

In FIG. 4, the first PRACH preamble 27a starts later than the beginning of the sub-frame 45 by a certain time 28b called a "UE downlink to uplink switch time" that is preconfigured. The time between the end of the first PRACH preamble 27a and the second PRACH preamble 27b to the end of the second sub-frame 45 is called a "guard time" 28. This "guard time" is used such that no PRACH preamble sent within the cell in question will arrive at the eNodeB 2 outside the sub-frame 45.

All PRACH preambles in a cell 2 have the same length, which length is set such that a PRACH preamble that is sent from the second UE 4b, that is farthest away from the eNodeB 2, still is received and detected at the eNodeB 2 within one and the same sub-frame, which is shown for the second PRACH preamble 27b.

Figure 5:
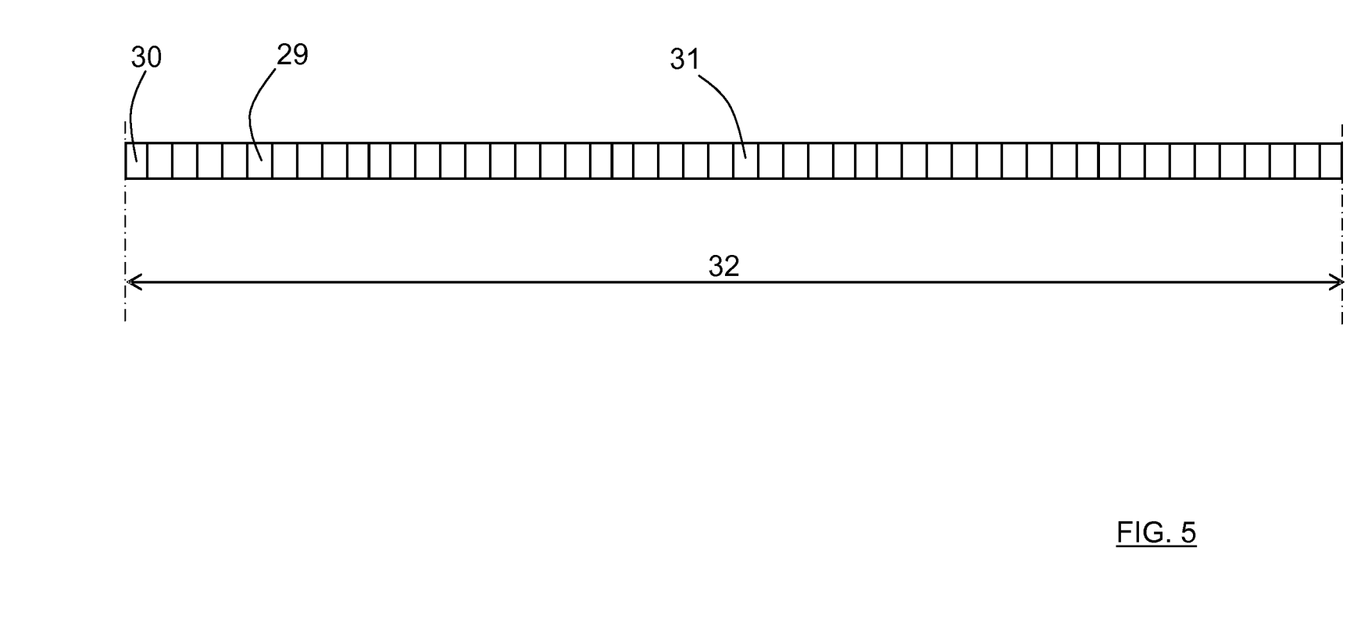
FIG. 5 shows a radio frame with fixed sub-frames.

As shown in FIG. 5, showing a radio-frame 32 of 10 ms, a dynamic TDD system is here configured with a few sub-frames 30, 31 which are fixed for downlink, i.e., they cannot be used for uplink. These sub-frames 30, 31 might be needed for transmitting synchronization signals and broadcasting control messages used for initial downlink synchronization, continuous downlink synchronization, and call setup. A dynamic TDD system can also be configured with fixed uplink sub-frames 29. Such sub-frames can, e.g., be used for PRACH to support initial access and uplink synchronization. In this example, the UE can transmit PRACH preambles in sub-frame number five 29, which in this TDD system is a fixed allocation to uplink transmissions. In the same way, the sub-frames number zero 30 and twenty-five 31 are in this TDD system fixed allocations to downlink transmissions.

Figure 6:
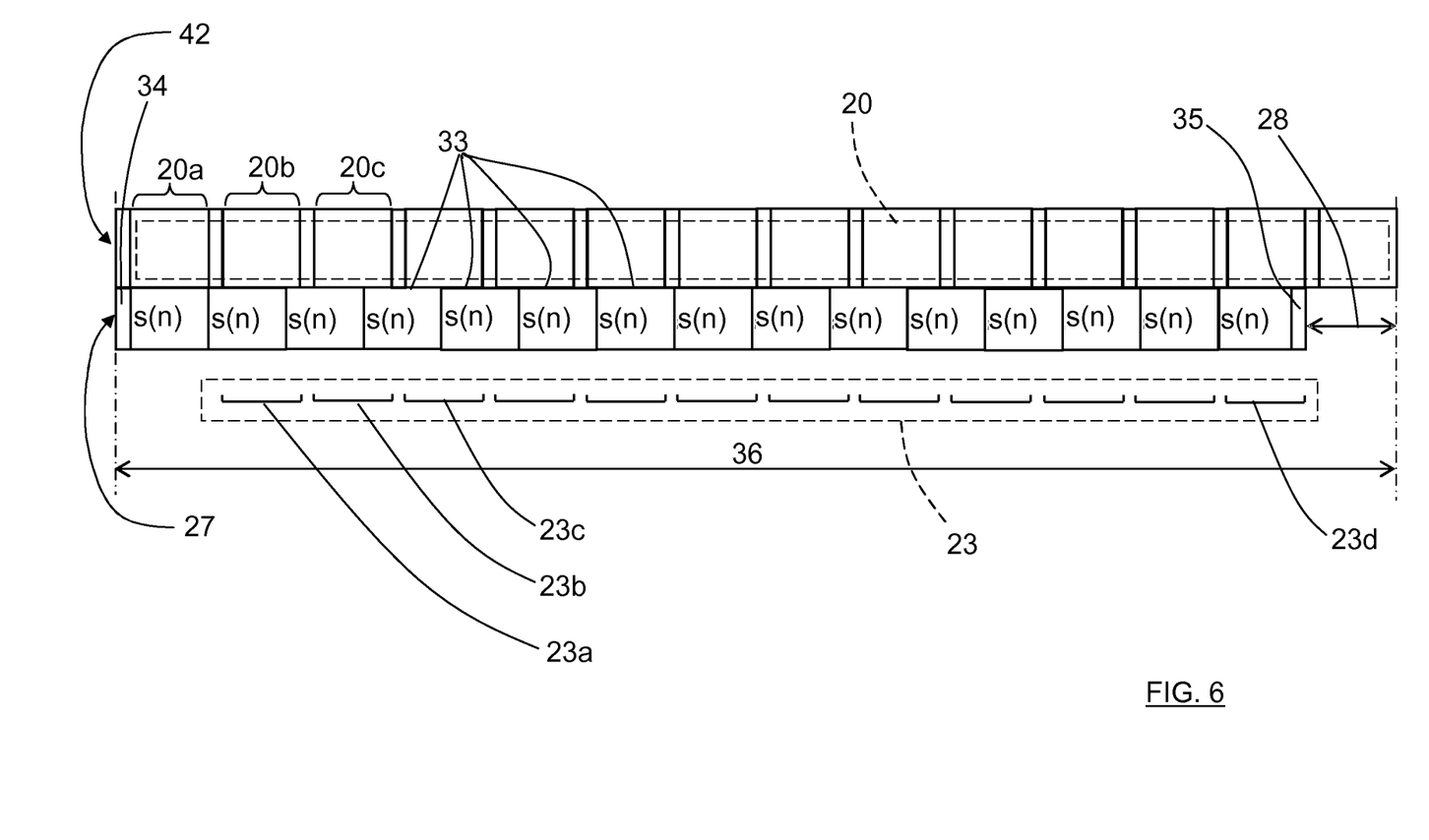
FIG. 6 shows a PRACH format according to the present invention.

According to the present invention, with reference to FIG. 6 showing one sub-frame 36 at a UE with a PUSCH 42, for each UE, the created PRACH preamble 27 is designed such that it comprises a sequence of a plurality of identical random access sequences s(n) (only a few indicated in FIG. 6), where each random access sequence s(n) has the same length in time as each OFDM symbol 20a, 20b, 20c (only a few indicated in FIG. 6), that is used for all other physical channels, such as user and control data, and reference signals.

A number of FFT windows 23a, 23b, 23c, 23d (only a few indicated in FIG. 6) are used to collect received signals to be used in FFT processing. The same FFT windows 23a, 23b, 23c, 23d can be used for PRACH and all other physical channels, such as user and control data, and reference signals.

The preamble sequence is created by repeating the random access sequence s(n) a number of times such that the constructed PRACH preamble 27 is at least as long as the time span of the desired number of FFT windows 23 plus maximum round trip time.

With renewed reference to FIG. 7, in the second sub-frame 17, a first PRACH preamble 27a and a second PRACH preamble 27b are shown, where the first PRACH preamble 27a has an early arrival and the second PRACH preamble 27b has a late arrival, and where there is a guard time 28 in the same way as discussed previously with reference to FIG. 4.

There is a plurality of OFDM symbols 20 inside the second sub-frame 17, each of them processed separately with the same-sized FFT 24. By using a number of these FFT:s 24, for example twelve of them as illustrated by the FFT windows 23 in FIG. 6, or fourteen as illustrated by the FFT windows 23 in FIG. 7, it is possible to detect the PRACH preamble 27a, 27b despite the fact that the PRACH preamble 27a, 27b occurs over most of the second sub-frame 17. Hence, the FFT 24 tailored to the OFDM symbols 20 is reused for the PRACH preamble 27a, 27b.

The preamble sequence s(n) depends on the PRACH frequency allocation, such that the number of sub-carriers allocated for PRACH equals the maximum number of symbols in the sequence. For example, with LTE nomenclature, six resource blocks are allocated to PRACH, which correspond to 72 sub-carriers.

A short sequence can, e.g., be constructed by using Zadoff-Chu sequences. The $u^{th}$ root Zadoff-Chu sequence is defined as $$x_u(n) = e^{-j\frac{\pi u n(n+1)}{N_{ZC}}}, 0 \leq n \leq N_{ZC} - 1, \qquad (1)$$

where the length $N_{ZC}$ of the Zadoff-Chu sequence is a prime number. For a PRACH allocation of 72 sub-carriers, the sequence length can, e.g., be set to 71. A time-continuous short random-access signal s(t) is defined by $$s_{short}(t) = \beta_{PRACH} \sum_{k=0}^{N_{ZC}-1} \sum_{n=0}^{N_{ZC}-1} x_u(n) \cdot e^{-j\frac{2\pi nk}{N_{ZC}}} \cdot e^{j2\pi(k+k_0)\Delta ft}, \qquad (2)$$

where $0 \leq t < T_{short}$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing. The location in the frequency domain is controlled by the parameter $n_{PRB}^{RA}$; the resource block size in the frequency domain, expressed as a number of subcarriers, is denoted by $N_{sc}^{RB}$, and the uplink bandwidth configuration, expressed in multiples of $NR_{sc}^{RB}$, is denoted by $N_{RB}^{UL}$.

A short sequence of the same length as the OFDM symbol is achieved by $T_{short}=1/\Delta f$. For LTE Release 8, this sub-carrier spacing equals $\Delta f=15$ kHz [see Table 6.2.3-1 in 3GPP 36.211] such that the length of the short sequence equals $T_{short}=66.6$ μs. With a change in subcarrier spacing to, e.g., $\Delta f=75$ kHz, then the length of the short symbol equals $T_{short}=13.3$ μs.

The preamble to be transmitted is constructed by a repetition of the short sequence, which can be formulated as $$s(t)=s_{short}((t-T_{CP})\bmod(T_{short})), \qquad (1)$$

where $0 \leq t < T_{SEQ}$, and $T_{CP}$ is the length of a possible PRACH preamble first cyclic prefix 34 inserted before the first short sequence.

This PRACH preamble first cyclic prefix contains a number of the last samples of the short sequence s(n). By the repetition of the short sequence s(n) into the PRACH preamble, each short sequence will act as a cyclic prefix for the next short sequence. By this construction, the PRACH preamble first cyclic prefix might be excluded. The only function of this PRACH preamble first cyclic prefix is a time shift of the transmitted PRACH preamble. For small cells, such a time shift can be used to define different preambles, such that different UE:s can select different time shifts of the same PRACH preamble. Each time shift is then specified as a specific value of the length $T_{CP}$ of the PRACH preamble first cyclic prefix.

The length of the preamble and thus also the number of repetitions of the short sequence is controlled by $T_{SEQ}$. This length of the preamble is selected based on:
  the length of the time window allocated for PRACH,
  the required cell size, and
  restrictions based on guard time for switching between transmitting and receiving in case of a TDD system.

By this repetition of the short sequence, each short sequence will act as a cyclic prefix for the next short sequence.

As shown in FIG. 6, the PRACH preamble 27 comprises a first random access sequence s(n) that is preceded by a short PRACH preamble first cyclic prefix 34 and then repeated fourteen times, and succeeded by a final part 35 that is part of the first random access sequence s(n). This final part 35 is inserted at the end of the PRACH preamble 27 such that the PRACH preamble 27 covers the whole length of the last FFT window 23d.

Figure 8:
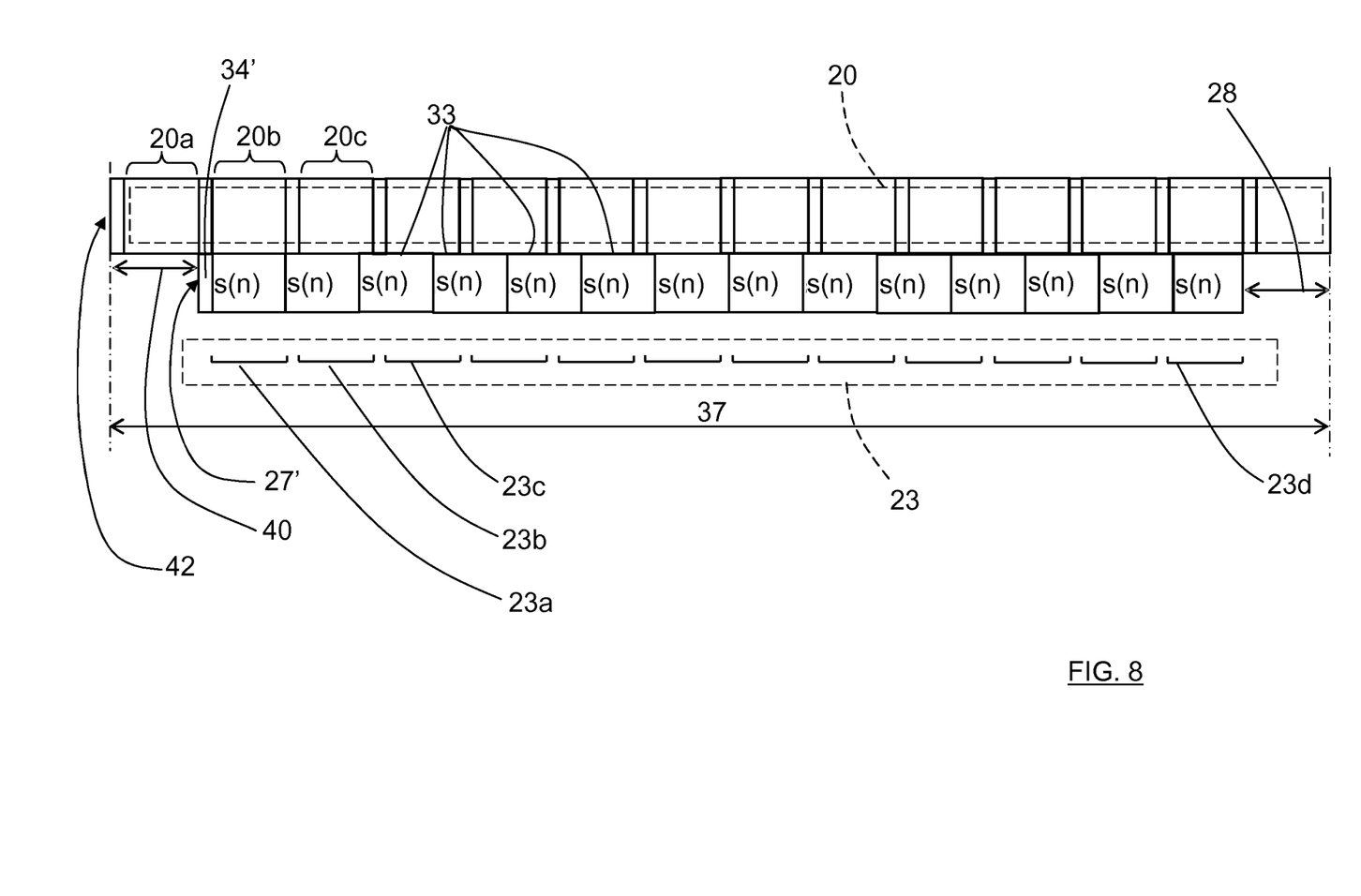
FIG. 8 corresponds to FIG. 6, where an initial guard time is added.

A PRACH preamble sequence 27' suited for a TDD (Time-Division Duplex) system is illustrated in FIG. 8, corresponding to FIG. 6 and also showing a sub-frame 37. Here, the PRACH preamble 27' is shortened such that it begins later compared to the PRACH preamble in FIG. 6, by means of an initial guard time 40. This shortened sequence 27' is beneficial when the receiver unit 8 and transmitter unit 9 at the eNodeB 2 need some time for switching between transmitting and receiving. A fraction of the initial guard time 40 may be used to create the "UE downlink to uplink switch time" 28b discussed previously, and may also be referred to as a TDD guard time.

Several UE:s 4a, 4b might transmit the same preamble within the same PRACH time-frequency window causing a contention. In order to identify individual UE:s, each UE can have a mutually equal set of different preambles from which it randomly selects the preamble to transmit. With a larger number of preambles in the set, the risk of two UEs selecting the same preamble decreases. In the example of using Zadoff-Chu sequences, the different sequences correspond to selecting the variable u. For a Zadoff-Chu sequence of length 71, there are in practice 70 different sequences; in theory 71 sequences, but excluding the sequence corresponding to u=0. Adjacent cells should preferably also use different sets of preamble sequences.

The number of available sequences can be increased by increasing the PRACH bandwidth allocation. With an increased amount of sub-carriers, the length of the Zadoff-Chu sequence can be increased such that the number of possible values of the variable u increases. As an example, with a 12 RB allocation, i.e., 144 subcarriers, a total of 139 Zadoff-Chu sequences can be generated.

The PRACH time interval can be split into several intervals, with independent PRACH preamble transmissions. See illustration in FIG. 9, which corresponds to FIG. 6. Here, a sub-frame 38 is split into two slots 38a, 38b with different preambles 39a, 39b with different preamble sequences $s_1(n)$, $s_2(n)$. The UE 4a, 4b can then randomly select to transmit in either the first slot 38a or the second slot 38b, which reduces the risk of contention. Here, the different sequences $s_1(n)$ and $s_2(n)$ might be configured for possible use in the different intervals, or the same sequence might be used, i.e., $s_1(n)=s_2(n)$. The different random access sequences $s_1(n)$ and $s_2(n)$ are randomly chosen from a set of a plurality of random access sequences.

Figure 9:
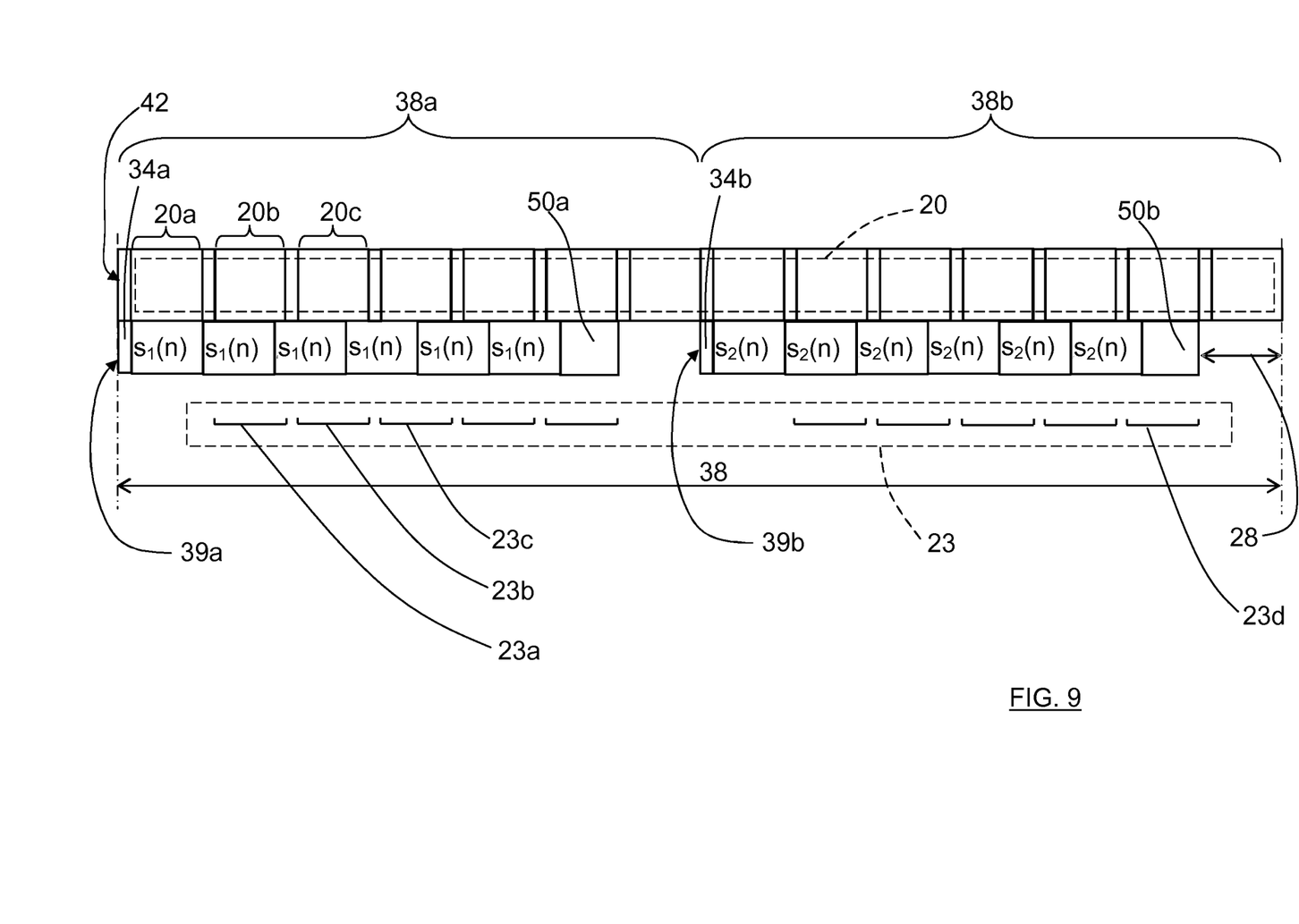
FIG. 9 shows a sub-frame that is split in two parts, with different possible PRACH preambles in each part.

Another possibility is to transmit in both slots 38a, 38b, but randomly select different sequences in the two slots 38a, 38b. This also reduces the risk of collision; if there is a collision in the first slot 38a there is hopefully none in the second slot 38b.

Figure 10:
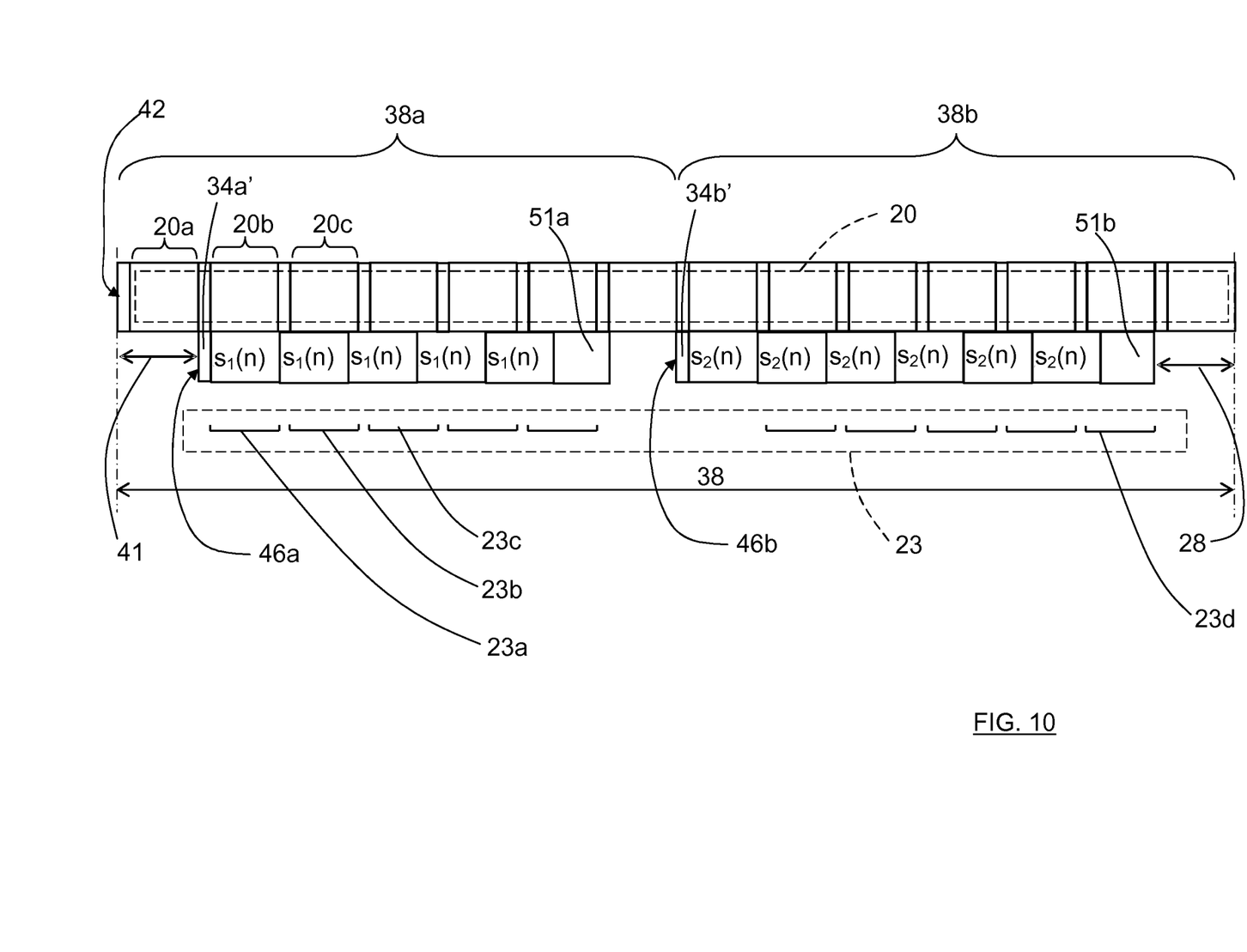
FIG. 10 corresponds to FIG. 9, where an initial guard time is added.

Yet an alternative format is illustrated in FIG. 10, corresponding to FIG. 9 with two slots 38a, 38b with different preambles 46a, 46b with different preamble sequences $s_1(n)$, $s_2(n)$. Here, an initial guard time 41 is furthermore included to be used for switching from transmitting to receiving in an eNodeB in the same way as described for FIG. 8. Instead of splitting the PRACH time interval, the number of intervals can be increased by using more uplink sub-frames for PRACH to reduce the risk of contention.

Generally, a user terminal is arranged to transmit one of two PRACH preambles 39a, 39b; 46a, 46b chosen from a set of possible PRACH preambles, in one sub-frame 38. The two possible PRACH preambles 39a, 39b; 46a, 46b have mutually different random access sequences $s_1(n)$, $s_2(n)$.

Figure 11:
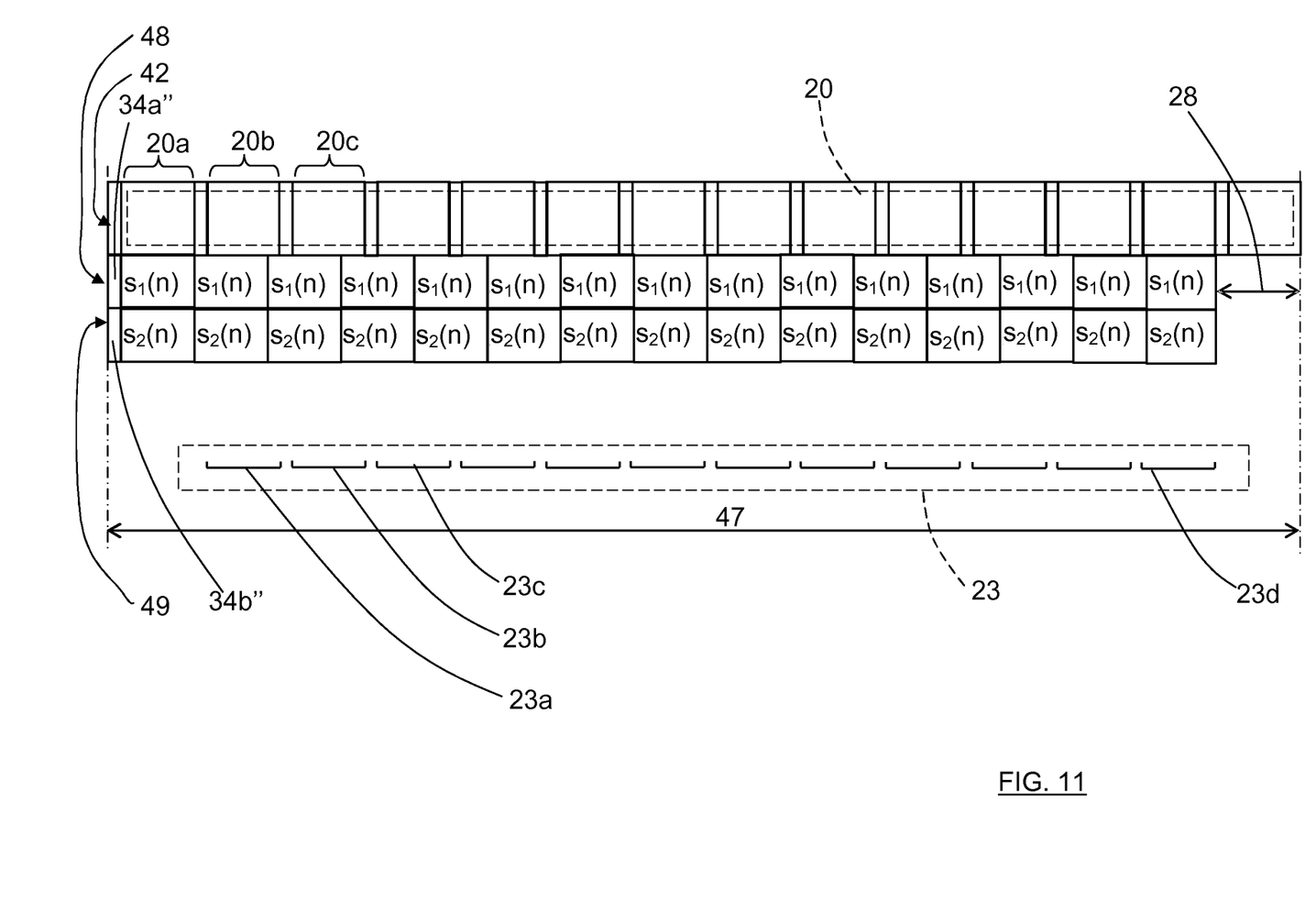
FIG. 11 shows different possible PRACH preambles at different frequencies.

Another method to reduce the risk of collisions is to allocate several PRACH bandwidth allocations. FIG. 11 shows an example of a sub-frame 47 where two parallel PRACH bandwidth allocations are illustrated. Here, different sequences $s_1(n)$ and $s_2(n)$ might be configured for possible use in the different bandwidth intervals forming two different possible PRACH preambles 48, 49, or the same sequence might be used, i.e., $s_1(n)=s_2(n)$. The UE can randomly select to transmit in one of the available bandwidth allocations to decrease the risk of contention. There may be more than the illustrated two PRACH bandwidths.

A user terminal is thus arranged to transmit a chosen PRACH preamble 39a, 39b; 46a, 46b at one of two or more possible different frequency bands.

The example of FIG. 11 may also be re-configured to include an initial guard time as in FIG. 10.

The present invention is not limited to the above, but may vary freely within the scope of the appended claims. For example, a guard period must always be included in TDD systems, when the UE cannot transmit and receive simultaneously. A guard period can be created by omitting one or several OFDM symbols in downlink. In systems that utilize redundancy encoding, the receiving UE can treat those omitted OFDM symbols as "punctured" symbols, and reconstruct the data that would normally have been carried by those symbols using normal decoding techniques. Alternatively, the receiving UE can decode the data in the remaining portion of the sub-frame while working around the symbol intervals that carry no data. In either case, if the guard period is created by omitting one or several OFDM symbols in downlink then the eNodeB 2 needs to send control messages to all UE:s, indicating that the last OFDM symbols of a sub-frame are omitted.

With puncturing in the downlink signal, all UEs must be aware of this guard period, either by explicit signaling to all UEs or by detection in the UEs. By instead only puncturing the uplink transmissions, as detailed herein, only the UE that transmits in uplink has to be aware of this switch from downlink to uplink. A control message included in the uplink grant provides a very small extra control signaling overhead, and can be received by the UE in a sub-frame other than the sub-frame which is punctured. The disclosed techniques thus result in a robust system without the need for detection of the switch from downlink to uplink and with low signaling load.

An eNodeB 2 as shown in FIG. 1 may have an antenna arrangement 11 that uses beam-forming, in either or both of the downlink and uplink, to increase the signal-to-interference-plus-noise ratio (SINR) for a UE. This beam-forming can be done in baseband, in which case a change between different beam-formers can be done on a sample-to-sample basis. However, for other types of beam-forming techniques, such as analog beamforming realized with microwave or RF phase adjusters, a guard might be needed for the components to apply this change of beam-forming. Also, a guard period can be used to halt transmission in uplink during a calibration phase. In these cases, the eNodeB can instruct the UE to omit one or several of the first OFDM (or SC-FDMA) symbols in a given uplink sub-frame, for this purpose.

Although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

The descriptions in this invention disclosure are focused on TDD mode of operation. However, the invention also directly applies to FDD (Frequency-Division Duplex) systems with straightforward adaptations. For FDD systems the problem descriptions related to switch time between transmission and receptions do not apply.

Hardware implementations of the present invention may include or encompass, without limitation, digital signal processor (DSP) hardware, a reduced instruction set processor, hardware (e.g., digital or analog) circuitry including but not limited to application specific integrated circuit(s)

(ASIC) and/or field-programmable gate array(s) (FPGA(s)), and (where appropriate) state machines capable of performing such functions.

The UE:s 4a, 4b are generally constituted by user terminals and may for example comprise cellular telephones, personal digital assistants, smart phones, laptop computers, handheld computers, machine-type communication/machine-to-machine (MTC/M2M) devices or other devices with wireless communication capabilities. It should be noted that the term UE or user terminal does not necessarily imply that the terminal itself is mobile or moveable, and should be understood to be interchangeable with the term "wireless device", and may refer to terminals that are installed in fixed configurations, such as in certain machine-to-machine applications, as well as to portable devices, devices installed in motor vehicles, etc.

As mentioned previously, in LTE, the downlink is based on OFDM, while the uplink is based on DFT-spread OFDM, also known as SC-FDMA. Generally, these symbols are constituted by OFDM based symbols.

Also for the PRACH preambles 39a, 39b; 46a, 46b shown in FIG. 9 and FIG. 10, there are final parts 50a, 50b; 51a, 51b of the PRACH preambles 39a, 39b; 46a, 46b that are inserted in the ends such that the corresponding PRACH preambles 39a, 39b; 46a, 46b cover the whole length of the last FFT window 23d.

Cyclic prefixes 34'; 34a, 34b; 34a', 34b'; 34a", 34b" are used for the examples described with reference to FIG. 8, FIG. 9, FIG. 10 and FIG. 11. The cyclic prefix is not necessary in all cases, and in some cases, it is possible that cyclic prefixes are omitted when a PRACH preamble starts at the same time as a sub-frame.

The present invention relates to PRACH preambles sent in uplink; therefore, generally, the node 2 is at least arranged to receive communication from the user terminals 4a, 4b.

All specific details provided in the above description are provided as examples only in order to provide a better understanding of the present invention. For example, the number of OFDM symbols, PRACH random access sequences s(n), sampling frequencies, lengths of radio frames and sub-frames may vary such that a suitable and desired functionality is acquired.

The invention claimed is:

1. A user terminal (UE) in a wireless communication system, the user terminal comprising:
 a receiver circuit;
 a transmitter circuit configured to transmit data in transmit sub-frames that occur at defined sub-frame intervals and that comprise a plurality of Orthogonal Frequency-Division Multiplexing (OFDM) symbols;
 a control circuit configured to control the receiver circuit and the transmitter circuit;
 wherein the control circuit is also configured to create a Physical Random-Access CHannel (PRACH) preamble as an uplink transmission to a node that is arranged to receive communication from the user terminal in the OFDM symbols of the sub-frames; and
 wherein the control circuit is further configured to create each PRACH preamble from a sequence comprising a plurality of identical random access sequences, where each random access sequence has the same length in time as one of the OFDM symbols.

2. The user terminal of claim 1, wherein the user terminal is configured to transmit one PRACH preamble in one sub-frame.

3. The user terminal of claim 1, wherein the user terminal is configured to transmit one of two PRACH preambles, chosen from a set of possible PRACH preambles, in one sub-frame; the two possible PRACH preambles having mutually different random access sequences.

4. The user terminal of claim 3, wherein the user terminal is configured to transmit the chosen PRACH preamble at one of two or more possible different frequency bands.

5. The user terminal of claim 3, wherein the chosen PRACH preamble is shortened such that it begins later in the corresponding sub-frame by means of an initial guard time.

6. The user terminal of claim 3, wherein each PRACH preamble further comprises a cyclic prefix that precedes the sequence comprising the plurality of identical random access sequences.

7. The user terminal of claim 3, wherein each PRACH preamble comprises a plurality of random access sequences succeeded by a final part that is part of one of the random access sequences, the final part being inserted at the end of the PRACH preamble such that the PRACH preamble covers a whole length of a last Fast Fourier Transform window.

8. The user terminal of claim 1:
 wherein each random access sequence is defined by means of a Zadoff-Chu sequence, where the $u^{th}$ root Zadoff-Chu sequence is defined as $$x_u(n) = e^{-j\frac{\pi u n(n+1)}{N_{ZC}}}, 0 \le n \le N_{ZC-1},$$

where a length $N_{ZC}$ of the Zadoff-Chu sequence is a prime number;
wherein a time-continuous random access sequence s(t) is defined by $$s_{short}(t) = \beta_{PRACH} \sum_{k=0}^{N_{ZC}-1} \sum_{n=0}^{N_{ZC}-1} x_u(n) \cdot e^{-j\frac{2\pi nk}{N_{ZC}}} \cdot e^{j2\pi(k+k_0)\Delta ft};$$

where $0 \le t < T_{short}$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing, where the location in the frequency domain is controlled by a parameter $n_{PRB}^{RA}$; a resource block size in the frequency domain, expressed as a number of subcarriers, is denoted by $n_{sc}^b$, and an uplink bandwidth configuration, expressed in multiples of $N_{sc}^{RB}$ is denoted by $N_{RB}^{UL}$.

9. A method for transmitting a Physical Random-Access Channel (PRACH) preamble from a user terminal (UE) to a node in a wireless communication system, the method comprising:
 creating a PRACH preamble from a sequence comprising a plurality of identical random access sequences, where each random access sequence has the same length in time as one Orthogonal Frequency-Division Multiplexing (OFDM) symbol used by the UE to transmit data during sub-frames that occur at defined sub-frame intervals and that comprise a plurality of the OFDM symbols; and
 transmitting the PRACH preamble during one sub-frame.

10. The method of claim 9, further comprising transmitting one of two PRACH preambles, chosen from a set of possible PRACH preambles, in one sub-frame, the two possible PRACH preambles having mutually different random access sequences.

11. The method of claim 10, further comprising transmitting the chosen PRACH preamble at one of two or more possible different frequency bands.

12. The method of claim 10, further comprising shortening the chosen PRACH preamble such that it begins later in the corresponding sub-frame by means of an initial guard time.

13. The method of claim 10, wherein each PRACH preamble further comprises a cyclic prefix that precedes the sequence comprising the plurality of identical random access sequences.

14. The method of claim 9, wherein each PRACH preamble has a plurality of random access sequences succeeded by a final part that is part of one of the random access sequences, the final part being inserted at the end of the PRACH preamble such that the PRACH preamble covers a whole length of a last Fast Fourier Transform window.

15. The method of claim 9, further comprising:
creating each random access sequence from a Zadoff-Chu sequence, where the $u^{th}$ root Zadoff-Chu sequence is defined as $$x_u(n) = e^{-j\frac{\pi u n(n+1)}{N_{ZC}}}, 0 \le n \le N_{ZC-1},$$

where a length $N_{ZC}$ of the Zadoff-Chu sequence is a prime number;

wherein a time-continuous random access sequence s(t) is defined by $$s_{short}(t) = \beta_{PRACH} \sum_{k=0}^{N_{ZC}-1} \sum_{n=0}^{N_{ZC}-1} x_u(n) \cdot e^{-j\frac{2\pi n k}{N_{ZC}}} \cdot e^{j2\pi(k+k_0)\Delta f t},$$

where $0 \le t < T_{short}$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing, where the location in the frequency domain is controlled by a parameter $n_{PRB}^{RA}$; a resource block size in the frequency domain, expressed as a number of subcarriers, is denoted by $N_{sc}^{RB}$, and an uplink bandwidth configuration, expressed in multiples of $N_{sc}^{RB}$ is denoted by $N_{RB}^{UL}$.

* * * * *

UNITED STATES PATENT AND TRADEMARK OFFICE
CERTIFICATE OF CORRECTION

PATENT NO. : 11,172,510 B2
APPLICATION NO. : 15/125641
DATED : November 9, 2021
INVENTOR(S) : Sahlin et al.

Page 1 of 2

It is certified that error appears in the above-identified patent and that said Letters Patent is hereby corrected as shown below:

In the Specification

In Column 7, Line 13, delete "(only" and insert -- 33 (only --, therefor.

In Column 7, Lines 60-61, delete " $x_a(n) = e^{-j\frac{\pi u n(n+1)}{N_{ZC}}}, 0 \leq n \leq N_{ZC} - 1,$ " and insert -- $x_u(n) = e^{-j\frac{\pi u n(n+1)}{N_{ZC}}}, 0 \leq n \leq N_{ZC} - 1,$ --, therefor.

In the Claims

In Column 12, Lines 26-29, in Claim 8, delete " $x_u(n) = e^{-j\frac{\pi u n(n+1)}{N_{ZC}}}, 0 \leq n \leq N_{ZC-1},$ " and insert -- $x_u(n) = e^{-j\frac{\pi u n(n+1)}{N_{ZC}}}, 0 \leq n \leq N_{ZC} - 1,$ --, therefor.

In Column 12, Line 47, in Claim 8, delete "$n_{sc}^b$," and insert -- $N_{sc}^{RB}$, --, therefor.

In Column 12, Line 49, in Claim 8, delete "$N_{sc}^{RB}$" and insert -- $N_{sc}^{RB}$, --, therefor.

In Column 13, Lines 22-24, in Claim 15, delete " $x_u(n) = e^{-j\frac{\pi u n(n+1)}{N_{ZC}}}, 0 \leq n \leq N_{ZC-1},$ " and Signed and Sealed this
Fourteenth Day of June, 2022

Katherine Kelly Vidal
*Director of the United States Patent and Trademark Office*

CERTIFICATE OF CORRECTION (continued)
U.S. Pat. No. 11,172,510 B2 insert -- $x_u(n) = e^{-j\frac{\pi u n(n+1)}{N_{ZC}}}, \quad 0 \leq n \leq N_{ZC} - 1$ ,--, therefor.

In Column 14, Line 23, in Claim 15, delete "$N_{sc}^{RB}$" and insert -- $N_{sc}^{RB}$, --, therefor.